United States Patent
Muto

(10) Patent No.: US 6,527,665 B1
(45) Date of Patent: Mar. 4, 2003

(54) DIFFERENTIAL GEARING

(76) Inventor: Tadanobu Muto, 1-18-13, Ishigamidai, Ooiso-machi, naka-gun, Kanagawa-ken (JP)

(*) Notice: Subject to any disclaimer, the term of this patent is extended or adjusted under 35 U.S.C. 154(b) by 42 days.

(21) Appl. No.: 09/711,903

(22) Filed: Nov. 15, 2000

(30) Foreign Application Priority Data

Nov. 15, 1999 (JP) .......................................... 11-323868

(51) Int. Cl.$^7$ .............................................. F16H 57/08
(52) U.S. Cl. ...................................................... 475/336
(58) Field of Search ................................ 475/197, 336, 475/338

(56) References Cited

U.S. PATENT DOCUMENTS

| | | | | |
|---|---|---|---|---|
| 1,761,308 A | * | 6/1930 | Morgan ................... | 475/336 X |
| 1,902,374 A | * | 3/1933 | Pirinoli .................... | 475/336 X |
| 2,262,797 A | * | 11/1941 | Chapman ................ | 475/336 X |
| 3,658,001 A | * | 4/1972 | Seybold .................... | 101/350 |
| 3,870,116 A | * | 3/1975 | Seliber ...................... | 74/571 X |
| 3,886,810 A | * | 6/1975 | Sugiyama et al. ......... | 74/571 |
| 4,495,836 A | * | 1/1985 | Cohen ........................ | 74/751 |
| 4,574,657 A | * | 3/1986 | Asfar ......................... | 74/766 |
| 5,106,353 A | * | 4/1992 | Ra et al. .................... | 475/336 X |
| 5,472,387 A | * | 12/1995 | Kamlukin ................... | 475/338 |
| 5,575,179 A | * | 11/1996 | Arbrink ...................... | 475/336 X |
| 5,692,989 A | * | 12/1997 | Kamlukin ................... | 475/338 X |
| 6,190,279 B1 | * | 2/2001 | Squires ..................... | 475/339 X |

FOREIGN PATENT DOCUMENTS

| | | | | |
|---|---|---|---|---|
| JP | 02080840 | * | 3/1990 | ................. 475/197 |
| JP | 402080840 A | * | 3/1990 | ............. 475/197 X |

* cited by examiner

*Primary Examiner*—Charles A Marmor
*Assistant Examiner*—Roger Pang
(74) *Attorney, Agent, or Firm*—Browdy and Neimark, P.L.L.C.

(57) ABSTRACT

A differential gear for outputting a sufficient torque when the speed of an output shaft is decreased in comparison with that of an input shaft. The differential gear is composed of a rotary input shaft 2 having a main drive rotating member 5, a plurality of intermediate rotating members 6, 8, 10, 12 constructed to provide an inertial force for transmitting sequentially rotary power of the main drive rotating member 5 while revolving around or staying on the axis of the input shaft, and a rotary output shaft 3 having a driven rotating member 13 to which rotary power of the final intermediate rotating member 12 is transmitted. The number of revolutions of the intermediate rotating members around the axis is adapted to increase with a decrease in speed of rotation of the output shaft 3 in comparison with the speed of rotation of the input shaft 2.

5 Claims, 2 Drawing Sheets

(A)

(B) I–I (C) II–II

DIFFERENTIAL GEARING

BACKGROUND OF THE INVENTION

This invention relates to differential gearings.

Conventional differential gearings are composed of a rotary input shaft having a main drive rotating member, a plurality of intermediate rotating members for transmitting sequentially rotary power of the main drive rotating member with revolving around or staying on the axis of the input shaft, and a rotary output shaft having a driven rotating member to which rotatory power of the final intermediate rotating member is transmitted.

The above-mentioned conventional differential gears, however, have problems such that although they are constructed to change the speed of rotation of the output shaft from that of the input shaft, they are lack in stability of torque (rotatory power) of the output shaft, and in particular a decrease in speed of rotation of the output shaft causes a decrease in torque, thereby exhibiting insufficient function as power transmission.

SUMMARY OF THE INVENTION

This invention was done to solve the conventional problems mentioned above, and is intended for providing a differential gear capable of outputting a sufficient torque in a strong and stable manner even though the speed of rotation of the output shaft is decreased in comparison with that of the input shaft.

The differential gearing in accordance with the present invention comprises a rotary input shaft having a main drive rotating member, a plurality of intermediate rotating members for transmitting sequentially rotatory power of the main drive rotating member with revolving around or staying on the axis of the input shaft, and a rotary output shaft having a driven rotating member to which the rotatory power of the final intermediate rotating member is transmitted, wherein number of revolutions of the intermediate rotating members around the axis is adapted to increase with a decrease in speed of rotation of the output shaft in comparison with the speed of rotation of the input shaft, and wherein at least a part or all of the intermediate rotating members have inertial force caused by the rotation, or a rotating or non-rotating inertial body revolvable and/or rotatable with the intermediate rotating members, such as flywheel or weight is provided. Furthermore, the differential gearing is characterized in that each of said rotating members is gear or friction gear. The differential gearing of the invention is characterized in that mass or shape of said inertial body or its distance from the revolvable shaft or rotatable shaft is varied alone or in combination.

BRIEF DESCRIPTION OF THE DRAWINGS

The invention will be more particularly described with reference to the accompanying drawings, in which.

DESCRIPTION OF THE INVENTION

Figure 1:
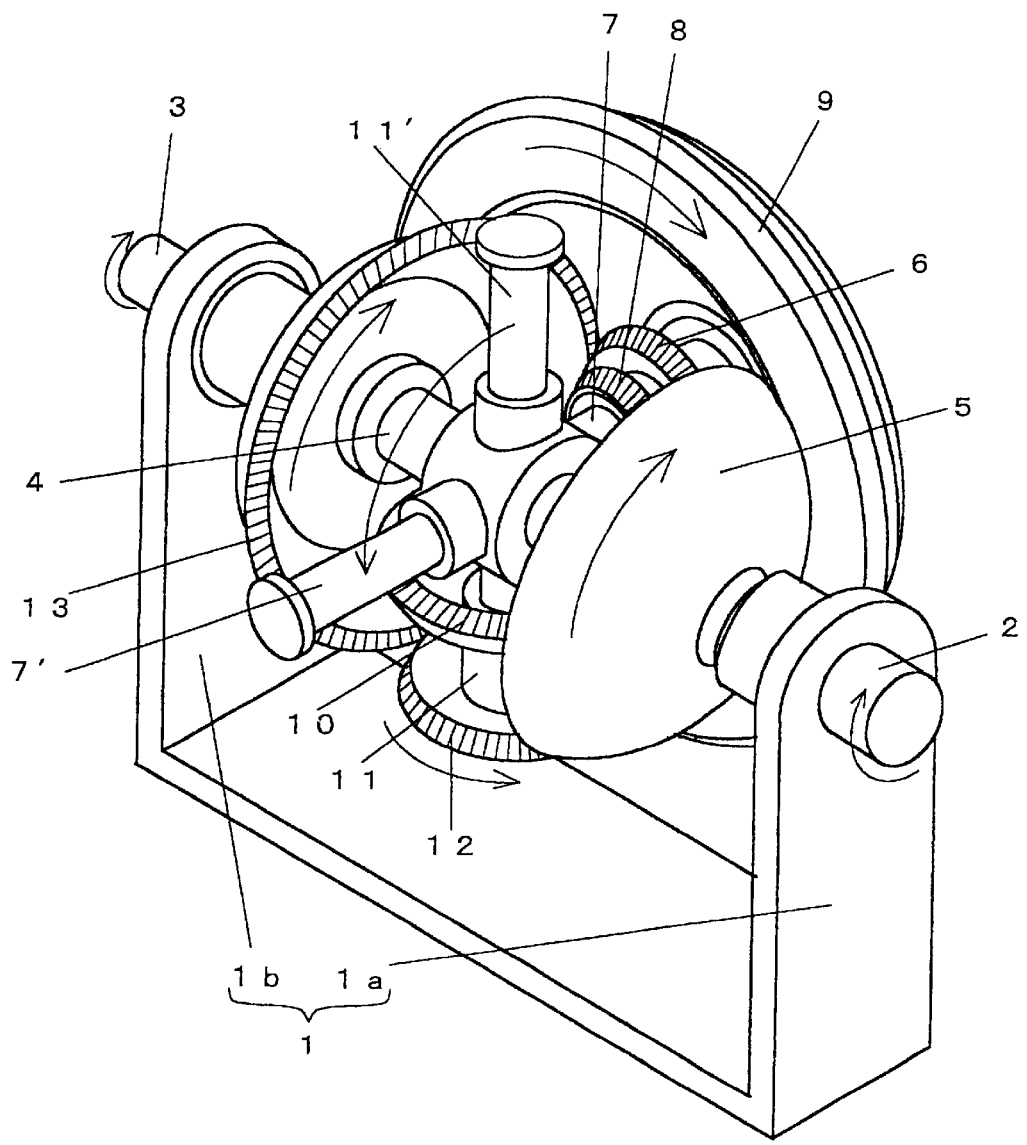
FIG. 1 is a perspective view illustrating one embodiment of differential gearings according to the present invention.
Figure 2:
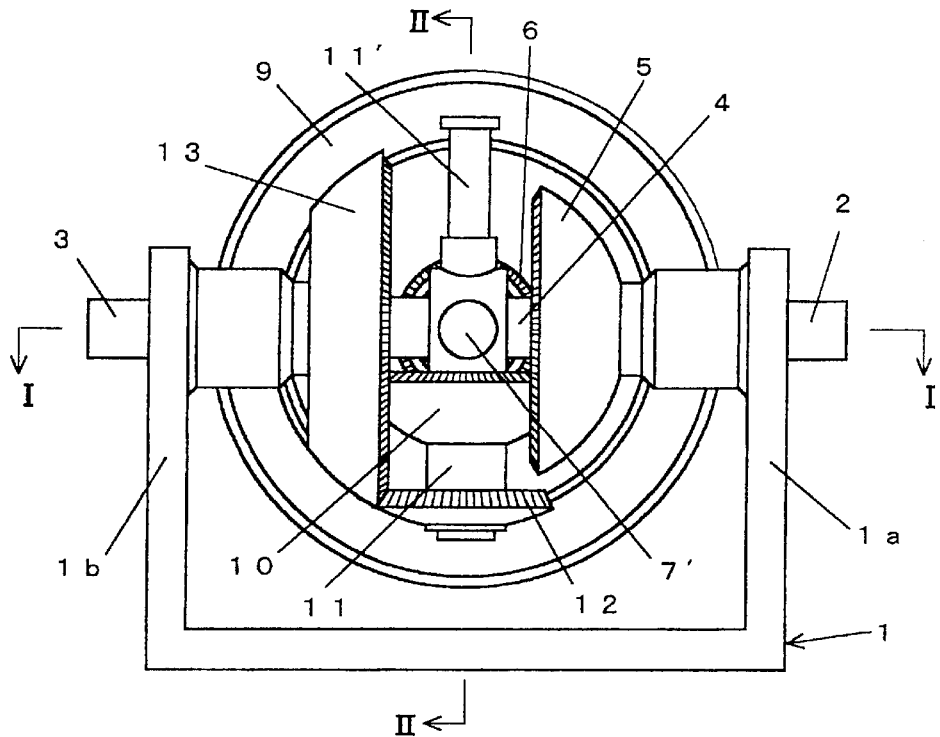
FIG. 2 is a front view (A) and a sectional view (B) taken along line I—I, and a sectional view (C) taken along line II—II of the gearing shown in FIG. 1.
Figure 2:
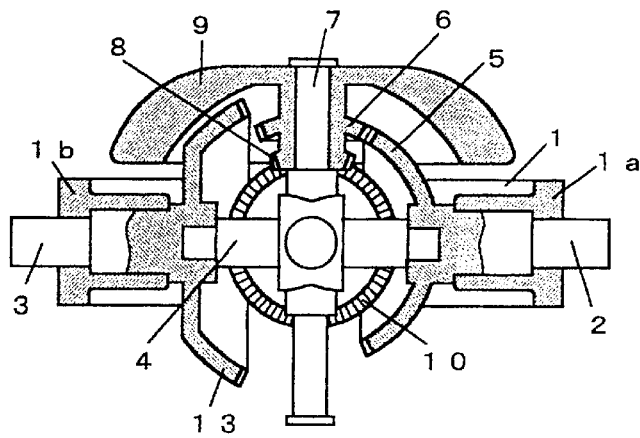
Figure 2:
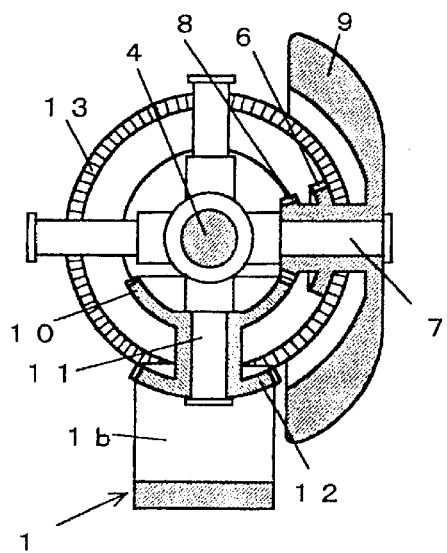

In FIG. 1, numeral 1 is a frame having two supports 1a and 1b. The supports 1a and 1b rotatively support a rotary input shaft 2 and a rotary output shaft 3, respectively. As clear from FIG. 2, a main revolvable shaft 4 is interposed between the input shaft 2 and the output shaft 3. These shafts 2, 3 and 4 have an axis in conformity with each other and are free to rotate individually without being bound together.

As apparent from FIGS. 2(A) and 2(B), the input shaft 2 is integrally provided with a main drive bevel gear 5 at the inner end. The bevel gear 5 engages a 1st intermediate bevel gear 6. The bevel gear 6 is rotatably supported on a 1st revolvable shaft 7 lying at a right angle to the shaft 4. In the embodiment of the present invention, the gear ratio of the bevel gear 5 to the bevel gear 6 is 2:1 and therefore one rotation of gear 5 results in two rotations of gear 6.

A 2nd intermediate bevel gear 8 is integrally provided at the inside of 1st bevel gear 6. Also a flywheel 9 is integrally provided at the outside of bevel gear 6. Therefore, the bevel gears 6 and 8 and the flywheel 9 integrally rotate on the 1st shaft 7.

As it is clear from FIG. 2(C), the 2nd bevel gear 8 engages a 3rd intermediate bevel gear 10. The bevel gear 10 is rotatably supported on a 2nd revolvable shaft 11 lying at a right angle to both of the shaft 4 and the shaft 7. In the embodiment of the present invention, the gear ratio of bevel gear 8 to bevel gear 10 is 1:2 and therefore one rotation of gear 8 results in a 1/2 rotation of gear 10.

A 4th intermediate bevel gear 12 is provided at the outside of the 3rd bevel gear 10 and integrally rotates on the shaft 11. The 1st shaft 7 and the 2nd shaft 11, which are perpendicular to each other, are integrally constructed with the shaft 4 and rotate around the axis thereof.

As clear from FIG. 2(A), the 4th bevel gear engages a driven bevel gear 13, which is integrally constructed at the inner end of the output shaft 3. The gear ratio of bevel gear 12 to bevel gear 13 is 1:2, and therefore one rotation of gear 12 results in a 1/2 rotation of gear 13.

Furthermore, it is desirable that a 1st revolvable shaft 7' constructed symmetrically to the 1st shaft 7 is symmetrically provided with the same members as the bevel gears 6 and 8 and the flywheel 9 so as to hold the whole balance although it is also possible to omit the bevel gears 6 and 8 or the flywheel 9 in connection to the 1st shaft 7'. It is further preferable that a 2nd revolvable shaft 11' constructed symmetrically to the 2nd shaft 11 is symmetrically provided with the same members as the bevel gears 10 and 12 although it is also possible to omit them.

The working function of differential gearing in the above embodiment is explained in the following. Under a condition where the shaft 4 is not rotated (no revolving), when the input shaft 2, i.e., the main drive bevel gear 5 rotates 1,000 revolutions, the 1st bevel gear 6 engaging therewith rotates 2,000 revolutions (gear ratio of gear 5 to gear 6 is 2:1). Since the 1st bevel gear 6 and the 2nd bevel gear 8 are formed integrally, the bevel gear 8 also rotates 2,000 revolutions.

When the 2nd bevel gear 8 rotates 2,000 revolutions, the 3rd bevel gear 10 engaging therewith rotates 1,000 revolutions (gear ratio of gear 8 to gear 10 is 1:2). Since the 3rd bevel gear 10 and the 4th bevel gear 12 are formed integrally, the 4th bevel gear 12 also rotates 1,000 revolutions.

When the 4th bevel gear 12 rotates 1,000 revolutions, the driven bevel gear 13 engaging therewith, i.e., the rotary output shaft 3 rotates 500 revolutions (gear ratio of gear 12 to gear 13 is 1:2). Accordingly, without revolution of the shaft 4, 1,000 revolutions of the input shaft 2 result in 500 (half) revolutions of the output shaft. The above working function is summed up in line 1 of Table 1 .

Under a condition where the shaft 4 rotates 1,000 revolutions, when the input shaft 2 (main drive bevel gear 5) rotates 1,000 revolutions, the 1st bevel gear 6 engaging therewith rotates 4000 revolutions. It is because, when the main drive bevel gear 5 rotates 1,000 revolutions with the shaft 4 being fixed, the 1st intermediate bevel 6 gear rotates 2,000 revolutions, when the shaft 4 rotates 1,000 revolutions with the rotation of the bevel gear 5 being stopped, the 1st bevel gear 6 rotates 2,000 revolutions, and therefore under the combined conditions, the 1st bevel gear 6 rotates 4,000 revolutions.

When the 1st bevel gear 6 rotates 4,000 revolutions, the 2nd bevel gear 8 integral therewith rotates 4,000 revolutions. Furthermore, the 3rd bevel gear 10 engaging with the 2nd bevel gear 8 and revolving together, rotates 2,000 revolutions depending on the gear ratio of 1:2. When the 3rd bevel gear 10 rotates 2,000 revolutions, the 4th bevel gear 12 integrally formed therewith also rotates 2,000 revolutions.

When the 4th bevel gear 12 rotates 2,000 revolutions, the driven bevel gear 13 engaging therewith, i.e., the output shaft 3 rotates 0 revolution. It is because, when the 4th bevel gear 12 rotates 2,000 revolutions with the shaft 4 being fixed (no revolving), the driven bevel gear 13 rotates 1,000 revolutions depending on the gear ratio, when the shaft 4 rotates 1,000 revolutions under the condition that rotation of the 4th bevel gear is stopped, the driven bevel gear rotates 1,000 revolutions in reverse direction, and therefore under these combined conditions, the driven bevel gear rotates 1,000 revolutions in the arrow direction and 1,000 revolutions in its reverse direction, thereby rotating 0 revolution. The above working function is summed up line 6 of Table 1.

In the above, the working functions are described in the cases where number of revolutions of the shaft 4 is 0 or 1,000. Intermediate conditions thereof, i.e., 200, 400, 600 and 800 revolutions are given in lines 2 to 5 of Table 1. As shown in Table 1, when number of revolutions of the shaft 4 is increased, number of revolutions of the output shaft 3 on its shaft is decreased even though number of revolutions of the input shaft 2 is fixed. The 1st shaft 7 extending perpendicularly from the shaft 4 is provided with the flywheel 9 at the top thereof and thus, when number of revolutions of the shaft 4 is increased as described above, the inertial force is increased by flywheel 9 and torque (rotary power) is increased even if number of revolutions of the output shaft 3 is decreased. Contrary to the above, the more the number of revolutions of the output shaft 3 is, the smaller the torque is. As apparent from Table 1, when number of revolutions of the shaft 4 is increased, number of revolutions of the flywheel 9 on its own axis is also increased, the principle of top, i.e., gyroidal effect produces a power to restrain the above-mentioned revolution, and inertial force is also increased by the increase of number of revolutions, whereby further increasing torque of the output shaft 3.

TABLE 1

| Rotary input shaft 2, Main bevel gear 5 | Main revolvable shaft 4 | 1st inter. bevel gear 6, 2nd inter. bevel gear 8, Flywheel 9 | 3rd inter. bevel gear 10, 4th inter. bevel gear 12 | Rotary output shaft 13, Driven bevel gear 13 |
|---|---|---|---|---|
| 1,000 | 0 | 2,000 | 1,000 | 500 |
| 1,000 | 200 | 2,400 | 1,200 | 400 |
| 1,000 | 400 | 2,800 | 1,400 | 300 |
| 1,000 | 600 | 3,200 | 1,600 | 200 |
| 1,000 | 800 | 3,600 | 1,800 | 100 |
| 1,000 | 1,000 | 4,000 | 2,000 | 0 |

The arrows in FIG. 1 indicate +(plus) direction of rotation.

Although the gear ratio of bevel gears engaging each other is 1:2 (or 2:1) in the above embodiments, the present invention does not limit to these ratios and may employ any gear ratio (or radii ratio). Although the power transmission is explained with bevel gear in the above embodiments, the differential gearing of the present invention does not limit to this, and may employ power transmission, for example, with frictional contact by means of friction gear. In this case, even if the rotary output shaft is overloaded, it does not affect a motor or the like for rotating the input shaft due to slipping.

The 1st revolvable shaft is provided with a flywheel in the above embodiment. It is also possible to omit the flywheel by designing so as to attach weights to the gears and/or the outer end of the 1st revolvable shaft, which weights permit these members to have inertial force. Also, it is possible to attach the flywheel to the 2nd revolvable shaft 11, or to attach flywheels to both of the revolvable shafts 7 and 11. Furthermore, mass or shape of said inertial body such as flywheel or its distance from the revolvable shaft or rotary shaft is altered so that its gyroidal effect strains the revolution, in the other words, adjusts torque of rotary output shaft.

1) In a differential gearing comprising a rotary input shaft having a main drive rotating member, a plurality of intermediate rotating members for transmitting sequentially rotatory power of the main drive rotating member with revolving around or staying on the axis of the input shaft, and a rotary output shaft having a driven rotating member to which rotatory power of the final intermediate rotating member is transmitted, number of revolutions of the intermediate rotating members around the axis is adapted to increase with a decrease in speed of rotation of the output shaft in comparison with the speed of rotation of the input shaft, and at least a part or all of the intermediate rotating members have inertial force caused by the rotation, or a rotating or non-rotating inertial body revolvable and/or rotatable with the intermediate rotating members, such as flywheel or weight is provided, thereby outputting a sufficient torque in a strong and stable manner even though the speed of rotation of the output shaft is decreased in comparison with that of the input shaft.

2) Each of said rotating members is gear to secure reliable number of revolutions, or is friction gear to prevail an overload from causing damage to the gearing.

3) Mass or shape of said inertial body or its distance from the revolvable shaft or rotatory shaft is altered, so that its gyroidal effect restrains the revolution, in the other words, adjusts torque of rotary output shaft.

While the invention has been particularly shown and described with reference to preferred embodiments thereof, it will be understood by those skilled in the art the foregoing and other change in form and details can be made therein without departing from the spirit and scope of the invention.

What is claimed is:

1. A differential gearing comprising a rotary input shaft rotatable about a first axis and having a main drive rotating member, a plurality of intermediate rotating members, including a final intermediate rotating member, that are rotatable about at least one second axis that is perpendicular to the first axis for transmitting sequentially rotary power of the main drive rotating member by revolving around or staying on the axis of the input shaft, the plurality of intermediate rotating members being mounted to rotate together about the first axis and with the second axis, and a rotary output shaft having a driven rotating member to which rotary power of the final intermediate rotating member is transmitted, wherein number of revolutions of the intermediate rotating members around the second axis is adapted to increase with a decrease in speed of rotation of the output shaft in comparison with the speed of rotation of the input shaft, and wherein said gearing further comprises a flywheel fixed to one of said intermediate rotating members and rotatable about the second axis to produce an inertial force.

2. The differential gearing as claimed in claim 1, in which each of said rotating members is a gear.

3. The differential gearing as claimed in claim 1, in which mass or shape of said inertial body or its distance from the revolvable shaft or rotatory shaft is altered alone or in combination.

4. The differential gearing as claimed in claim 2, in which mass or shape of said inertial body or its distance from the revolvable shaft or rotary shaft is altered alone or in combination.

5. The differential gearing as claimed in claim 2, in which each said gear is a friction gear.

* * * * *